April 12, 1955 D. WEIGHTON 2,706,219

CAMERA TUBE OUTPUT CIRCUIT WITH DEGENERATIVE AMPLIFIER

Filed March 15, 1950

Inventor
Donald Weighton
By
Blair & Black
Attorneys

United States Patent Office 2,706,219

Patented Apr. 12, 1955

2,706,219

CAMERA TUBE OUTPUT CIRCUIT WITH DEGENERATIVE AMPLIFIER

Donald Weighton, Cambridge, England, assignor to Pye Limited, Cambridge, England, a British company Application March 15, 1950, Serial No. 149,676

1 Claim. (Cl. 178—7.2)

The present invention relates to television apparatus and has for its object to improve the signal-to-noise ratio in the output from the television camera. In television cameras the output electrode of the pick-up tube is fed to a load resistance which is made of a high value, generally of the order of 1 to 2 megohms, for the purpose of obtaining a good signal-to-noise ratio. The voltage variations across this load resistor are fed to the pick-up tube amplifier. Due to the capacitive losses occurring across the load resistor, for example the capacity between the backing plate of the pick-up tube to ground and the amplifier input capacity, the frequency response characteristic has to be compensated and this is generally effected by a compensating network included in the main amplifier.

The response characteristic of the pick-up tube load resistor and pre-amplifier is generally of a form falling with frequency, and according to the present invention there is also connected in the circuit an inductance which, with the existing capacity has a resonant frequency whereby the output characteristic is provided with a hump at this resonant frequency, thereby increasing the area below the output frequency curve and consequently increasing the signal-to-noise ratio, a negative feedback path being provided from the output of the amplifier to the load resistor to compensate for the resonance produced by the inductance.

In order that the invention may be more clearly understood, reference will now be made to the accompanying drawings, in which.

Figure 1:
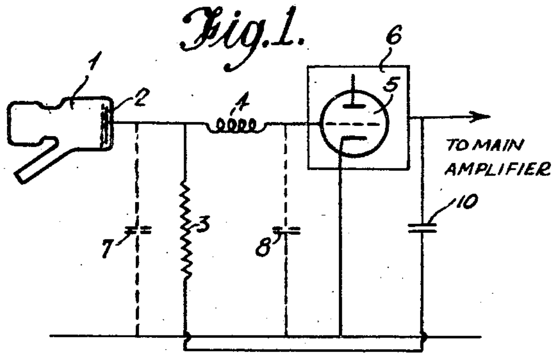
Fig. 1 shows a circuit arrangement according to the present invention.

Referring to Fig. 1, the pick-up tube is shown diagrammatically at 1 as of the image-iconoscope type having its output electrode 2 connected to a load resistance 3 of the order of 1 to 2 megohms.

Figure 2:
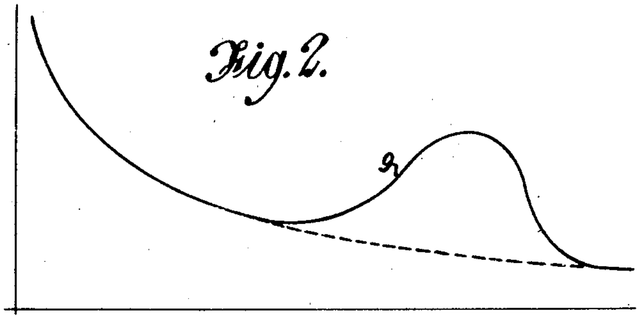
Fig. 2 is a graph for explaining the invention.

According to the invention a series inductance 4 is connected between the load resistor and the input electrode of the first valve 5 of the pre-amplifier 6. 7 and 8 represent the stray capacities between the output electrode 2 and ground and across the amplifier input. The provision of this series inductance 4 produces a pronounced resonance 9 in the response characteristic of the circuit (see Fig. 2) which is compensated by negative feedback, by feeding back the output signal from the amplifier 6 through the condenser 10, to the load resistor 3. Preferably a sufficiently high feedback ratio is employed, as described in the specification of co-pending U. S. application Serial No. 129,009, filed Nov. 23, 1949, now U. S. Patent No. 2,649,501, so that the negative feedback not only compensates for the pronounced resonance introduced by the inductance 4 for improving the signal-to-noise ratio, but also compensates for variations in the impedance of the pick-up tube with variations of the average illumination thereof.

Whilst a particular embodiment has been described, it will be understood that various modifications may be made without departing from the scope of the invention as defined by the appended claim.

I claim:

Television transmitting apparatus, comprising a pick-up tube having an output electrode, a load resistor for the pick-up tube across which the output signal from the pick-up tube is developed one end of said load resistor being connected to said output electrode, an amplifier for amplifying the voltage output from said pick-up tube, an inductance connected in series between said output electrode and the input to said amplifier for increasing the signal level at higher frequencies of the output signal from the pick-up tube, a negative feedback connection between the output of said amplifier and the other end of said resistor arranged to compensate for the resonance produced by said inductance, and an output lead connected to the output of said amplifier.

References Cited in the file of this patent

UNITED STATES PATENTS

| | | |
|---|---|---|
| 1,790,898 | Case | Feb. 3, 1931 |
| 2,261,335 | Braden | Nov. 4, 1941 |
| 2,299,875 | Bedford | Oct. 27, 1942 |
| 2,299,891 | Fredendall | Oct. 27, 1942 |
| 2,339,863 | Knoop | Jan. 25, 1944 |

FOREIGN PATENTS

| | | |
|---|---|---|
| 505,453 | Great Britain | May 11, 1939 |